US012650597B2

(12) United States Patent
Seadat Beheshti et al.

(10) Patent No.: US 12,650,597 B2
(45) Date of Patent: Jun. 9, 2026

(54) ELECTRONIC DEVICES WITH NOSE SENSING

(71) Applicant: Apple Inc., Cupertino, CA (US)

(72) Inventors: Matin Seadat Beheshti, Sunnyvale, CA (US); Javier Mendez, San Jose, CA (US); Xinsheng Chu, Saratoga, CA (US); Corentin A Guebels, Bainbridge Island, WA (US); Laurence M Flath, Moss Beach, CA (US)

(73) Assignee: Apple Inc., Cupertino, CA (US)

( * ) Notice: Subject to any disclaimer, the term of this patent is extended or adjusted under 35 U.S.C. 154(b) by 276 days.

(21) Appl. No.: 18/344,692

(22) Filed: Jun. 29, 2023

(65) Prior Publication Data

US 2025/0004273 A1      Jan. 2, 2025

(51) Int. Cl.
| | |
|---|---|
| *G02B 27/01* | (2006.01) |
| *G01L 19/00* | (2006.01) |
| *G02C 5/04* | (2006.01) |
| *G02C 5/12* | (2006.01) |

(52) U.S. Cl.
CPC ...... G02B 27/0172 (2013.01); G01L 19/0038 (2013.01); G02C 5/045 (2013.01); G02C 5/122 (2013.01); G02C 5/126 (2013.01)

(58) Field of Classification Search
CPC ........ G02C 5/045; G02C 5/122; G02C 5/126; G02B 2027/0178; G02B 27/0176; G02B 2027/0152; G02B 2027/0154; G02B 2027/0167
See application file for complete search history.

(56) References Cited

U.S. PATENT DOCUMENTS

| | | | |
|---|---|---|---|
| 10,729,371 | B2 | 8/2020 | Abreu |
| 11,150,674 | B2 | 10/2021 | Liu et al. |
| 2019/0250651 | A1 * | 8/2019 | Liu ..................... G05D 16/2066 |
| 2020/0064635 | A1 * | 2/2020 | Franklin ........... G02B 27/0955 |

(Continued)

FOREIGN PATENT DOCUMENTS

| | | | | |
|---|---|---|---|---|
| CN | 108957758 | A * | 12/2018 | ......... G02B 27/0176 |
| CN | 112526753 | A * | 3/2021 | ......... G02B 27/0176 |

(Continued)

OTHER PUBLICATIONS

Birnschein et al. U.S. Appl. No. 18/336,703, filed Jun. 16, 2023 (Year: 2023).*

(Continued)

*Primary Examiner* — Cara E Rakowski
(74) *Attorney, Agent, or Firm* — Treyz Law Group, P.C.; David K. Cole

(57) ABSTRACT

A head-mounted device may include optical assemblies for presenting images to a user. Optical assembly positioning systems may be used to adjust the spacing between the optical assemblies to accommodate different interpupillary distances. The optical assembly positioning systems may have motors. Nose pressure sensors may be provided to detect nose pressure as optical assemblies are moved towards each other and towards nose surfaces by the motors. Motion of the optical assemblies can be halted whenever the detected nose pressure rises. The nose pressure sensors may each include an air pressure sensor and a pressure-sensing compressible air-filled chamber coupled to the air pressure sensor.

19 Claims, 7 Drawing Sheets

(56) References Cited

U.S. PATENT DOCUMENTS

| | | | | |
|---|---|---|---|---|
| 2020/0192089 | A1 | 6/2020 | Haddick et al. | |
| 2021/0271093 | A1 | 9/2021 | Poore et al. | |
| 2022/0252889 | A1 | 8/2022 | Knoppert et al. | |
| 2023/0418019 | A1* | 12/2023 | Birnschein | G06F 1/163 |
| 2024/0288697 | A1* | 8/2024 | Sa Glaister | G02B 27/0176 |
| 2024/0385440 | A1* | 11/2024 | Olson | G02B 1/11 |
| 2024/0385442 | A1* | 11/2024 | Sauers | G02B 27/0179 |
| 2024/0385443 | A1* | 11/2024 | Hoenig | G02B 27/017 |
| 2024/0385451 | A1* | 11/2024 | Franklin | G02B 27/0172 |
| 2024/0385452 | A1* | 11/2024 | Zimmerman | G02B 27/0179 |
| 2024/0385453 | A1* | 11/2024 | Ness | G02B 27/0093 |
| 2024/0385454 | A1* | 11/2024 | Motta | G02B 27/017 |
| 2024/0393601 | A1* | 11/2024 | Smith | G02B 27/0176 |
| 2024/0397680 | A1* | 11/2024 | Dunsmoor | G06F 1/203 |

FOREIGN PATENT DOCUMENTS

| | | | | | |
|---|---|---|---|---|---|
| CN | 213633994 | U | * | 7/2021 | |
| WO | WO-2024238704 | A1 | * | 11/2024 | G06F 3/011 |

OTHER PUBLICATIONS

Franklin U.S. Appl. No. 63/502,408, filed May 15, 2023 (Year: 2023).*

Machine translation of CN 213633994 U retrieved electronically from PE2E Search Jul. 30, 2025 (Year: 2025).*

Machine translation of CN108957758 retrieved electronically from PE2E Search (Year: 2018).*

Machine translation of CN112526753 retrieved electronically from PE2E Search (Year: 2021).*

* cited by examiner

ELECTRONIC DEVICES WITH NOSE SENSING

FIELD

This relates generally to electronic devices, and, more particularly, to electronic devices such as head-mounted devices.

BACKGROUND

Electronic devices have components such as displays and lenses. It can be challenging to customize such devices for different users.

SUMMARY

A head-mounted device may include optical assemblies for presenting images to a user. Optical assembly positioning systems may be used to adjust the spacing between the optical assemblies to accommodate different interpupillary distances.

Optical assembly positioning systems may use motors to move the optical assemblies. Nose pressure sensors may be provided to detect nose pressure as the optical assemblies are moved towards each other and towards a user's nose by the motors. In this way, motion of the optical assemblies can be halted when detected nose pressure rises. The nose pressure sensors may include air pressure sensors and nose-pressure-sensing compressible air-filled chambers coupled to the air pressure sensors.

DETAILED DESCRIPTION

Electronic devices such as head-mounted devices may have displays for displaying images and lenses that are used in presenting the images to eye boxes for viewing by a user. Different users have different spacings between their eyes, which are sometimes referred to as interpupillary distances. To accommodate users with different interpupillary distances, a head-mounted device may be provided with movable optical assemblies.

Figure 1:
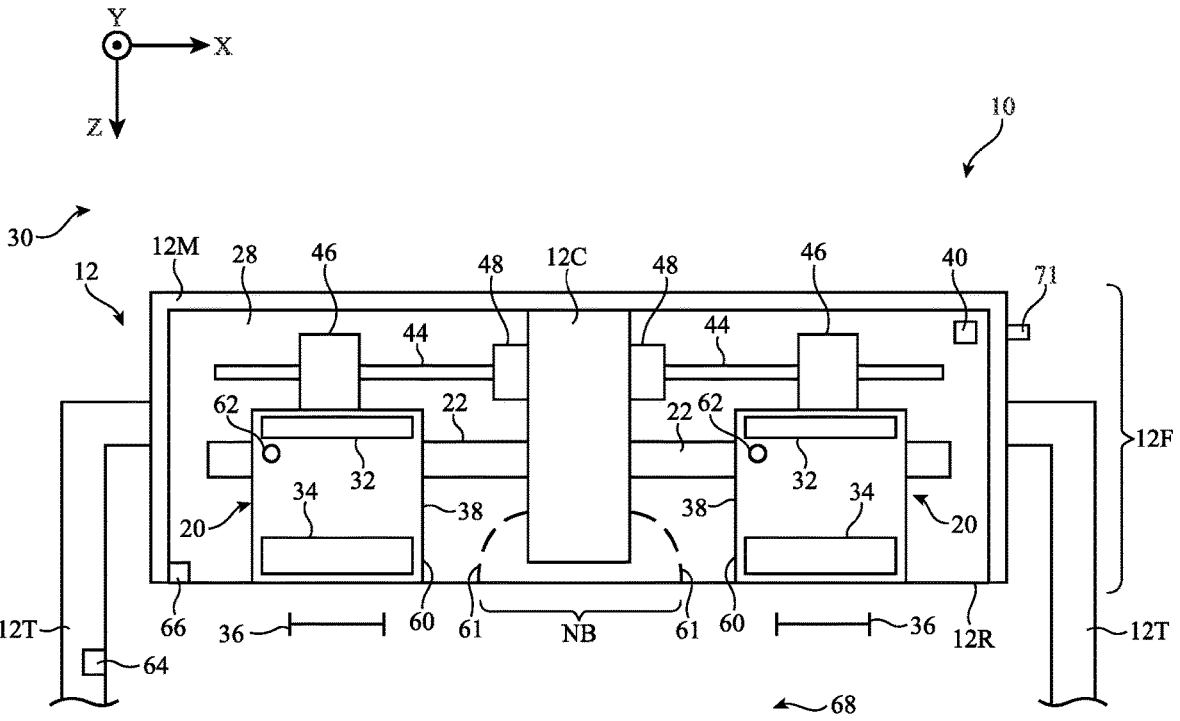
FIG. 1 is a diagram of an illustrative head-mounted device in accordance with an embodiment.

FIG. 1 is a schematic diagram of an illustrative electronic device of the type that may include movable optical assemblies to accommodate different interpupillary distances. Device 10 of FIG. 1 may be a head-mounted device (e.g., goggles, glasses, a helmet, and/or other head-mounted device). In an illustrative configuration, device 10 is a head-mounted device such as a pair of goggles (sometimes referred to as virtual reality goggles, mixed reality goggles, augmented reality glasses, etc.).

As shown in the illustrative cross-sectional top view of device 10 of FIG. 1, device 10 may have a housing such as housing 12 (sometimes referred to as a head-mounted support structure, head-mounted housing, or head-mounted support). Housing 12 may include a front portion such as front portion 12F and a rear portion such as rear portion 12R. When device 10 is worn on the head of a user, rear portion 12R rests against the face of the user and helps block stray light from reaching the eyes of the user and nose bridge portion NB of housing 12 rests on the nose of the user.

Main portion 12M of housing 12 may be attached to head strap 12T. Head strap 12T may be used to help mount main portion 12 on the head and face of a user. Main portion 12M may have a rigid shell formed from housing walls of polymer, glass, metal, and/or other materials. When housing 12 is being worn on the head of a user, the front of housing 12 may face outwardly away from the user, the rear of housing 12 (and rear portion 12R) may face towards the user. In this configuration, rear portion 12R may face the user's eyes located in eye boxes 36.

Device 10 may have electrical and optical components that are used in displaying images to eye boxes 36 when device 10 is being worn. These components may include left and right optical assemblies 20 (sometimes referred to as optical modules). Each optical assembly 20 may have an optical assembly support 38 (sometimes referred to as a lens barrel, optical module support, lens support, lens and display support, support, or support structure) and guide rails 22 along which optical assemblies 20 may slide to adjust optical-assembly-to-optical-assembly separation to accommodate different user interpupillary distances.

Each assembly 20 may have a display 32 that has an array of pixels for displaying images and a lens 34. Lens 34 may optionally have a removable vision correction lens for correcting user vision defects (e.g., refractive errors such as nearsightedness, farsightedness, and/or astigmatism). In each assembly 20, display 32 and lens 34 may be coupled to and supported by support 38. During operation, images displayed by displays 32 may be presented to eye boxes 36 through lenses 34 for viewing by the user.

Rear portion 12R may include flexible structures (e.g., a flexible polymer layer, a flexible fabric layer, and/or other flexible housing structures) so that portion 12R can stretch to accommodate movement of supports 38 toward and away from each other to accommodate different user interpupillary distances. These flexible portions may sometimes be referred to as a curtain, stretchable fabric curtain, etc.

The walls of housing 12 may separate interior region 28 within device 10 from exterior region 30 surrounding device 10. In interior region 28, optical assemblies 20 may be mounted on guide rails 22. Guide rails 22 may be attached to central housing portion 12C. If desired, the outer ends of guide rails 22 may be unsupported (e.g., the outer end portions of rails 22 may not directly contact housing 12, so that these ends float in interior region 28 with respect to housing 12).

Device 10 may include control circuitry and other components such as components 40. The control circuitry may include storage, processing circuitry formed from one or more microprocessors and/or other circuits. The control circuitry may be used to control any adjustable components in device 10 such as motors, actuators, displays, light-emitting components, audio components, etc. To support communications between device 10 and external equipment, the control circuitry may include wireless communications circuitry. Components 40 may include sensors such as such as force sensors (e.g., strain gauges, capacitive force sensors, resistive force sensors, etc.), audio sensors such as microphones, touch and/or proximity sensors such as capacitive sensors, optical sensors such as optical sensors that emit and detect light, ultrasonic sensors, and/or other touch sensors and/or proximity sensors, monochromatic and color ambient light sensors, image sensors, sensors for detecting position, orientation, and/or motion (e.g., accelerometers, magnetic sensors such as compass sensors, gyroscopes, and/or sensors such as inertial measurement units that contain some or all of these sensors), radio-frequency sensors, depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, visual inertial odometry sensors, current sensors, voltage sensors, and/or other sensors. In some arrangements, device 10 may use sensors to gather user input (e.g., button press input, touch input, etc.). Sensors may also be used in gathering environmental motion (e.g., device motion measurements, temperature measurements, ambient light readings, etc.).

Optical assemblies 20 may have gaze trackers 62 (sometimes referred to as gaze tracker sensors). Gaze trackers 62, which may operate through lenses 34, may include one or more light sources such as infrared light-emitting diodes that emit infrared light to illuminate the eyes of a user in eye boxes 36. Gaze trackers 62 also include infrared cameras for capturing images of the user's eyes and measuring reflections (glints) of infrared light from each of the infrared light sources. By processing these eye images, gaze trackers 62 may track the user's eyes and determine the point-of-gaze of the user. Gaze trackers 62 may also measure the locations of the user's eyes (e.g., the user's eye relief and the user's interpupillary distance).

To accommodate users with different interpupillary distances (eye-to-eye spacings), the spacing between the left and right optical assemblies 20 in device 10 can be adjusted (e.g., to match or nearly match the user's measured interpupillary distance). Device 10 may have left and right actuators (e.g., motors) such as motors 48. Each motor 48, which may include internal gears, may be used to rotate an elongated threaded shaft (screw) such as shaft 44. A nut 46 is provided on each shaft 44. The nut has threads that engage the threads on that shaft 44. When a shaft is rotated, the nut on the shaft is driven in a +X or −X direction (in accordance with whether the shaft is being rotated clockwise or counterclockwise). In turn, this moves the optical assembly 20 that is attached to the nut in the +X or −X direction along its optical assembly guide rail 22. Each assembly 20 (e.g., support 38) may have portions that receive one of guide rails 22 so that the assembly is guided along the guide rail. By controlling the activity of motors 48, the spacing between the left and right optical assemblies of device 10 can be adjusted to accommodate the interpupillary distance of different users. For example, if a user has closely spaced eyes, assemblies 20 may be moved inwardly (towards each other and towards nose bridge portion NB of housing 12) and if a user has widely spaced eyes, assemblies 20 may be moved outwardly (away from each other).

When device 10 is being worn by a user, the user's head is located in region 68. The presence of the user's head (and therefore a determination of whether device 10 is being worn or is unworn) may be made using one or more sensors (e.g., gaze trackers 62, which may detect the presence of the eyes of the user in eye boxes 36, rear-facing sensors such as sensor 66 on main housing 12M, head-facing sensors mounted on strap 12T such as sensor 64, and/or other head presence sensors). These sensors may include cameras, light sensors (e.g., visible light or infrared sensors that measure when ambient light levels have dropped due to shadowing by the head of a user), proximity sensors (e.g., sensors that emit light such as infrared light and that measure corresponding reflected light from a user's head with an infrared light sensor, capacitive proximity sensors, ultrasonic acoustic proximity sensors, etc.), switches and/or other force-sensing sensors that detect head pressure when a user's head is present, and/or other head presence sensors.

Output from head presence sensors and/or output from gaze trackers 62 may be used in controlling motors 48 to automatically adjust the spacing of optical assemblies 20. Optical assembly spacing may also be adjusted manually (e.g., by controlling motors 48 using a button such as button 71).

When device 10 is being worn and a user's head is present in region 68, the nose of the user will be present under nose bridge portion NB of housing 12. When optical assemblies 20 are moved towards each other so that assemblies 20 are spaced apart by an amount that matches or nearly matches the user's interpupillary distance, inner side surfaces 60 of support structures 38 in assemblies 20 and overlapping parts of rear portion 12R will move toward opposing outer side nose surfaces 61 of the user's nose. With sufficient inward movement of assemblies 20, surfaces 60 (and any intervening parts of rear portion 12R) may contact and press against nose surfaces 61. As a result, an outward force on assemblies 20 is created by nose surfaces 61.

To avoid discomfort that might arise if the user's nose is pressed against by more than a desired amount, device 10 may be provided nose pressure sensors. The nose pressure sensors may include air pressure sensors coupled to pressure-sensing compressible air-filled chambers (tubes, air-filled pillows, etc.). The air-filled chambers may be placed on or adjacent to surfaces 60, so that the air-filled chambers are contacted and compressed as surfaces 60 approach surfaces 61. As the air-filled chambers are compressed, the air-pressure sensors that are coupled to the air-filled chambers may sense the rise in pressure. Suitable action may then be taken. For example, if more than a threshold amount of pressure is detected, it can be concluded by the control circuitry of device 10 that there is a potential for discomfort and further inward motion of assemblies 20 may be halted.

Figure 2:
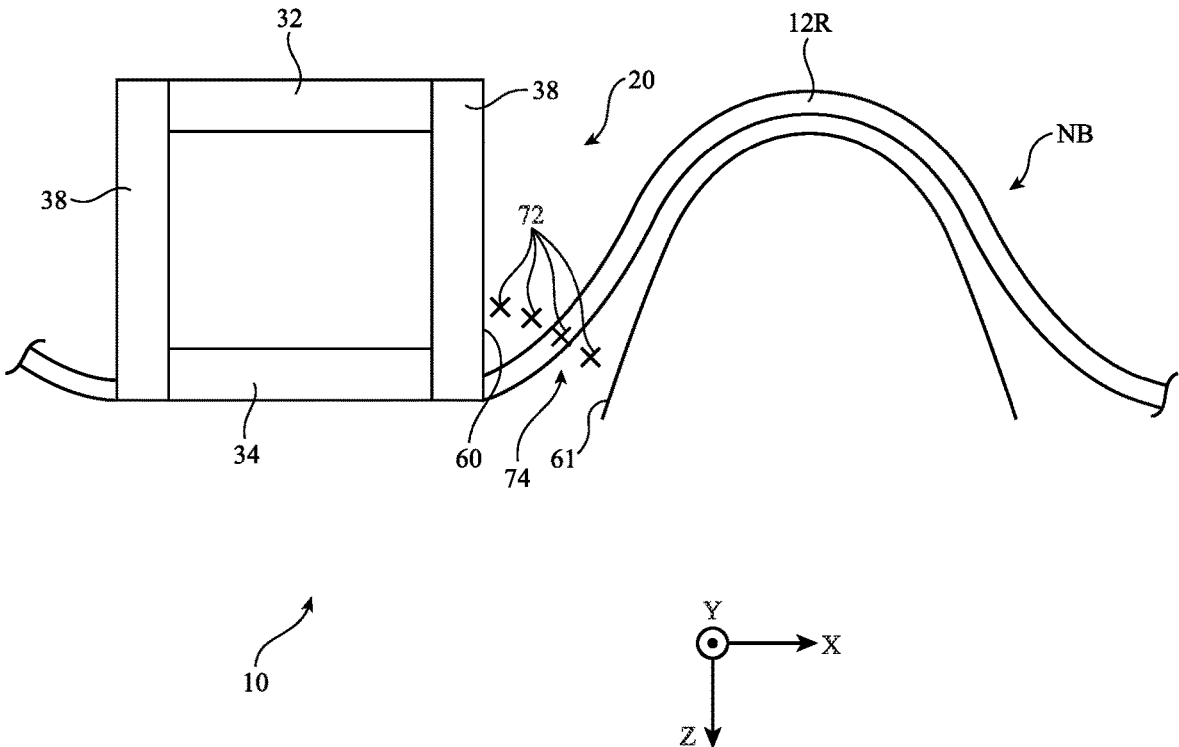
FIG. 2 is a cross-sectional top view of a portion of a head-mounted device in accordance with an embodiment.

FIG. 2 is a cross-sectional top view of an illustrative left-half portion of head-mounted device 10 showing illustrative locations 72 that may be used for the pressure-sensing compressible air-filled chambers (sometimes referred to as compressible air-filled chambers, pressure-sensing air-filled chambers, or air-filled chambers). As shown in FIG. 2, optical assembly 20 may include support 38 for supporting display 32 and lens 34. When device 10 is being worn on the head of a user, the user's nose may be present near nose bridge portion NB, so that nose surface 61 may face optical assembly 20. Exterior 74 of rear portion 12M faces nose surface 61, so rear portion 12M may be interposed between surface 61 and surface 60.

If optical assembly 20 is moved in the X direction (in the FIG. 2 example), surface 60 of support 38 may approach nose surface 61. Intervening parts of rear portion 12R of housing 12 may then become compressed between surface 60 of support 38 and nose surface 61. To sense pressure due to this nose contact, pressure-sensing air-filled chambers may be mounted between surface 61 and surface 60. As shown in FIG. 2, locations 72 at which the chambers may be mounted may include: 1) a location at the outer (external) side of portion 12R (between portion 12R and surface 61), 2) a location within portion 12R (e.g., embedded within a layer of fabric in a scenario in which portion 12R is composed partly or entirely from fabric), 3) a location on the inner surface of portion 12R (e.g., a location between portion 12R and surface 60, and 4) a location on the outer surface of support 38 (e.g., a location on surface 60, which is also between portion 12R and surface 60). In locations such as these, the air-filled cavities will be compressed as surface 60 is moved towards nose surface 61.

Figure 3:
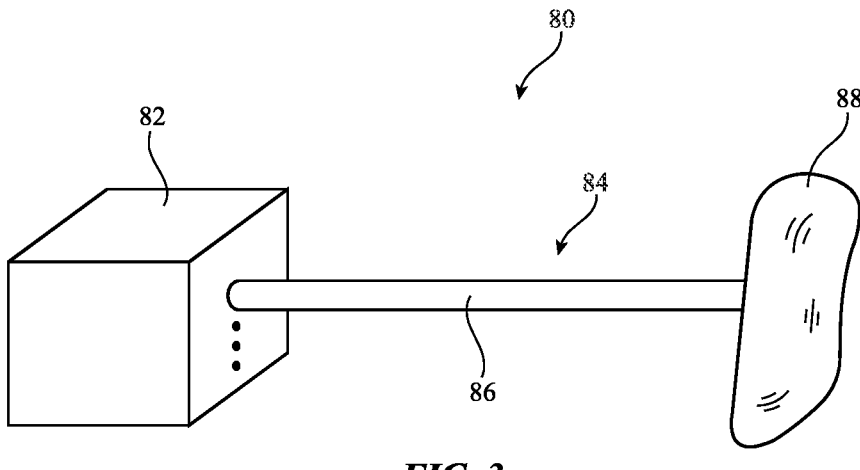
FIG. 3 is a perspective view of an illustrative air pressure sensor coupled by tubing to an air-filled pressure sensing chamber such as an air pillow in accordance with an embodiment.

FIG. 3 is a perspective view of an illustrative nose pressure sensor. Nose pressure sensor 80 of FIG. 3 includes air pressure sensor 82, hollow air-filled tubing 84 such as tube 86, and pressure-sensing compressible air-filled chamber 88. Tube 86 is in communication with chamber 88 and sensor 82. When chamber 88 is compressed between nose surface 61 and optical assembly 20, the pressure of the air in chamber 88 will increase and this increased pressure will therefore be sensed by sensor 82 through tube 86.

Chamber 88 in the example of FIG. 3 has the shape of a compressible pillow (e.g., a hollow pillow formed from an elastomer such as silicone or other flexible polymer that encloses an air-filled cavity). If desired, chambers such as chamber 88 may be formed from tubes. Sensor 82 may be a micro electro-mechanical systems (MEMS) sensor (e.g., a sensor with a deformable diaphragm whose deformation is measured using a capacitive sensor, resistive sensor, strain gauge, or other sensing technology) or any other suitable air pressure sensor that is configured to measure air pressure. Gaseous fluids such as air, nitrogen, argon, and/or other gasses may fill chamber 88 and tubing 84 or a liquid fluid such as water or other liquid may be used to fill chamber 88 and tubing 84. Configurations in which air is used to convey pressure measurements from chamber 88 to sensor 82 are described herein as an example.

Nose pressure sensor 80 may have one or more chambers 88 and tubing 84 may include one or more corresponding tubes 86, each of which is coupled between a respective port of sensor 82 and a respective one of the chambers 88. For example, chambers 88 may be formed using pressure-sensing compressible air-filled tubes that wrap at least partly around structure 38 and each of these tubes may be coupled by a respective tube 86 to a respective port of sensor 82. With this type of arrangement, the nose pressure on each of the pressure-sensing tubes may be measured individually, providing additional detail on the nature and location of pressure on nose surface 61 and providing redundancy to the pressure sensing system.

Figure 4:
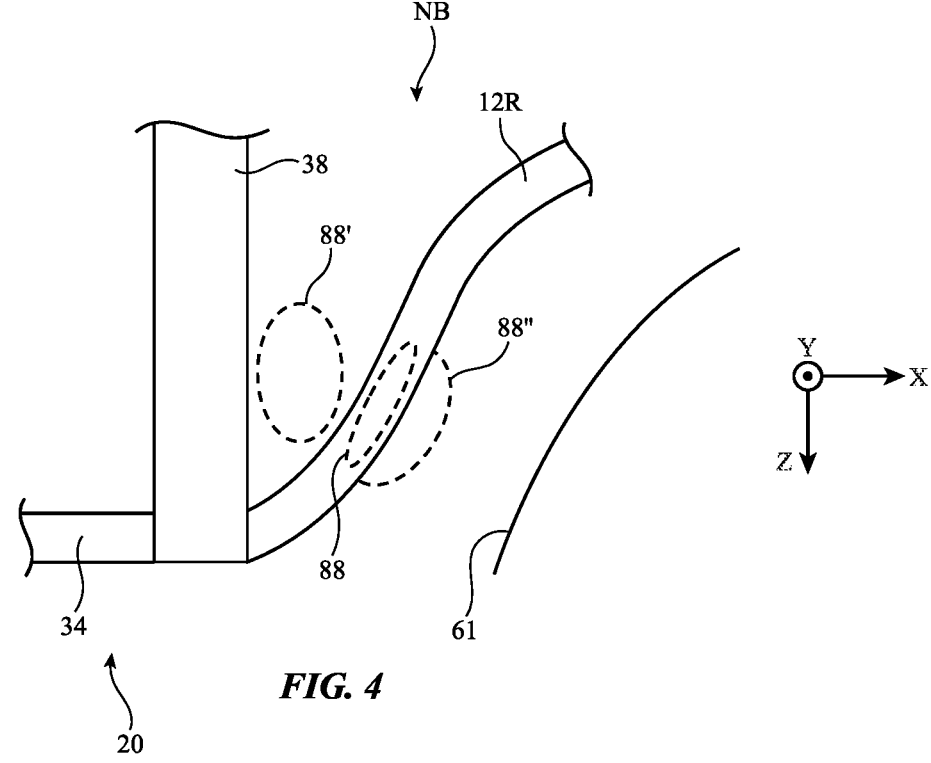
FIG. 4 is a cross-sectional top view of a portion of a head-mounted device with an air-filled pressure sensing chamber in accordance with an embodiment.

In the illustrative example of FIG. 4, pressure-sensing compressible air-filled chamber 88 has been embedded within portion 12R in nose bridge portion NB at a location between nose surface 61 and support 38. If desired, chamber

88 may be located at location 88' on the interior of portion 12R or location 88" on the exterior of portion 12R.

Figure 5:
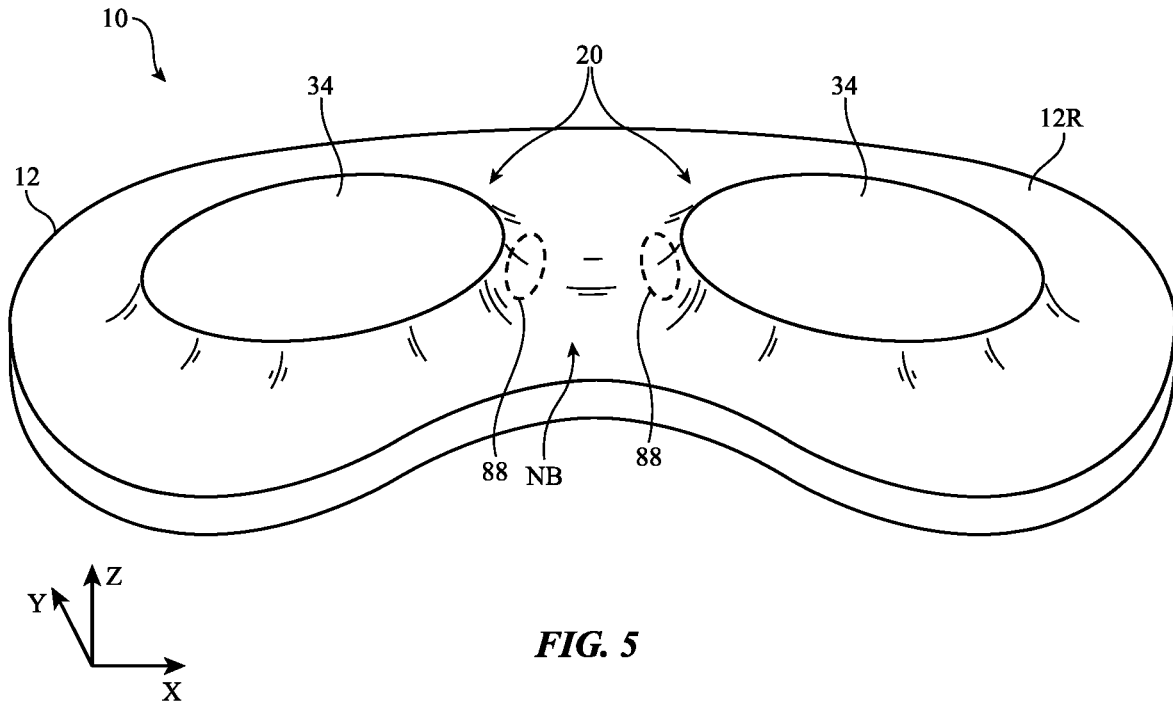
FIG. 5 is a perspective view of a rear portion of an illustrative head-mounted device in accordance with an embodiment.

FIG. 5 is a perspective view of a rear portion of device 10 showing how chambers 88 may be located on or in nose bridge portion NB of housing 12 at locations that face inwardly towards the locations of nose surfaces 61 when device 10 is worn on the head of a user. Chambers 88 of FIG. 5 may be, for example, compressible pillow-shaped elastomeric members with air-filled cavities.

Figure 6:
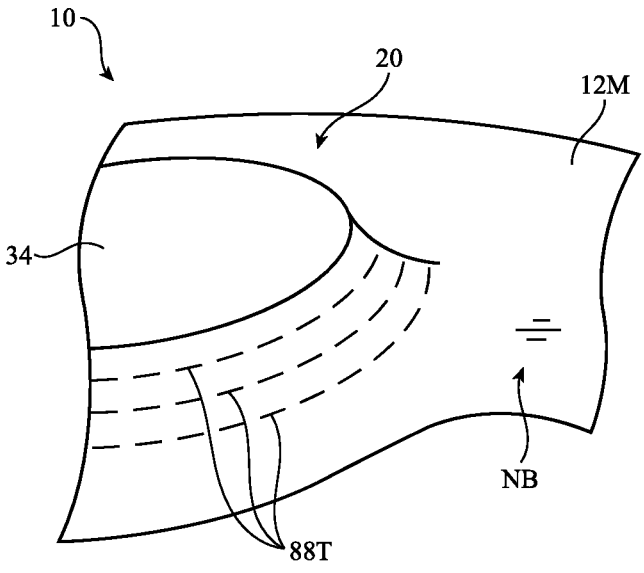
FIG. 6 is a perspective view of a rear portion of an illustrative head-mounted device with compressible chambers such as air-filled pressure sensing tubes in accordance with an embodiment.

As shown in FIG. 6, lengths of compressible air-filled tubing such as one or more tubes 88T may be used as nose pressure chambers in place of or in addition to pillow-shaped chambers 88 of FIG. 5. Tubes 88T may wrap entirely around the peripheries of assemblies 20 or may partly wrap around assemblies 20 (e.g., tubes 88T may extend at least around the inner sides of assemblies 20 as shown in FIG. 6). Tubes 88T may be connected in series to a single port of sensor 82 (FIG. 3) or sensor 82 may have multiple pressure sensing ports each of which is coupled individually to a different respective one of tubes 88T. When tubes 88T are used to independently sense nose pressure, each of these tubes may be coupled (by itself or via an additional tube) to a different respective air-pressure-sensing port of sensor 82.

Figure 7:
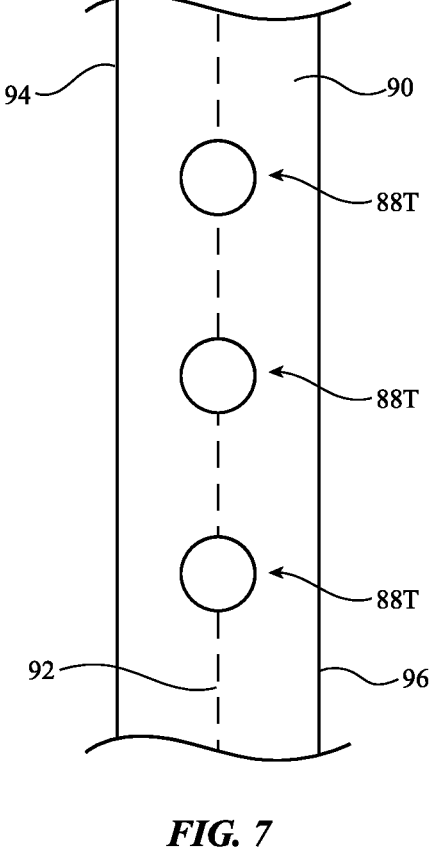
FIGS. 7 and 8 are cross-sectional views of illustrative air-filled pressure sensing chambers.
Figure 8:
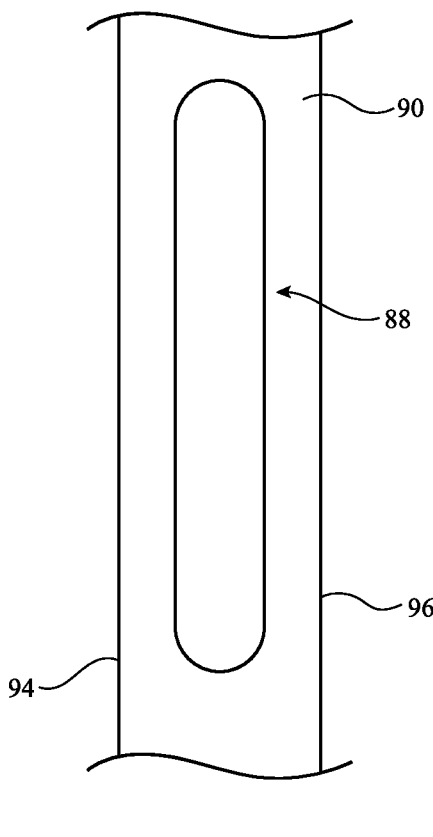

FIGS. 7 and 8 are cross-sectional views of illustrative arrangements for forming pressure-sensing compressible air-filled cavities for nose pressure sensor 80.

In the example of FIG. 7, pressure-sensing tubes 88T have been formed in a block of elastomeric material (elastomeric block 90). Block 90 may be mounted on the exterior of portion 12R (e.g., surface 94 of block 90 may contact the exterior of portion 12R), within portion 12R (e.g., as an embedded structure or an integral part of portion 12R), on the interior of portion 12R (e.g., surface 96 of block 90 may contact the interior of portion 12R), and/or on the exterior of support 38 (e.g., surface 94 may contact surface 60 of support 38). Block 90 may be formed from two separate parts that are joined along seam 92 (e.g., by polymer molding, adhesive bonding, thermal welding, and/or other joining techniques), may be formed from a polymer member that is molded around a pre-existing set of air-filled tubes, may be formed from a single molded pieces of material, and/or may be formed using other arrangements that allow the air-filled cavities within tubes 88T to be compressed in response to nose pressure.

In the example of FIG. 8, a pillow-shaped chamber 88 has been formed in elastomeric block 90. As with the arrangement of FIG. 7, the walls of block 90 and therefore the air-filled cavity within bock 90 may be compressed in response to nose pressure. Block 90 of FIG. 8 and its associated chamber 88 may be formed on an exterior surface of portion 12R (e.g., surface 94 may contact the exterior of portion 12R), may be formed within portion 12R (e.g., as an embedded structure or an integral part of portion 12R), may be formed on an interior surface of portion 12R (e.g., surface 96 may contact the interior of portion 12R), and/or may be formed on the exterior of support 38 (e.g., surface 94 may contact surface 60 of support 38).

Figure 9:
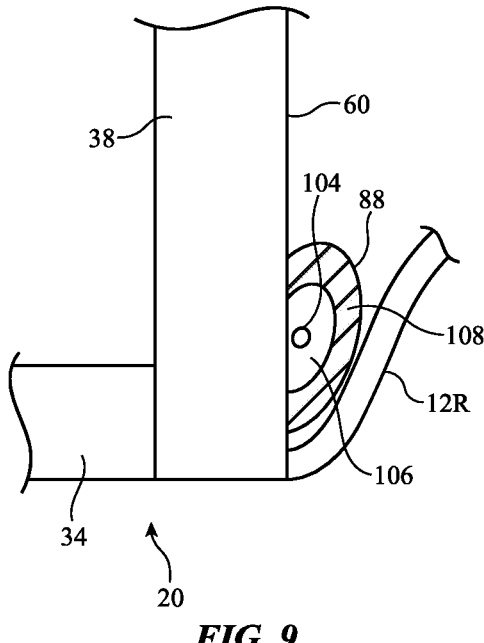
FIG. 9 is a cross-sectional view of an illustrative pressure sensing element formed from polymer overmolded onto a side portion of an optical assembly support in accordance with an embodiment.

FIG. 9 is a cross-sectional view of an illustrative nose pressure sensor arrangement in which chamber 88 has been formed on surface 60 of support 38 (e.g., by overmolding polymer onto surface 60, by attaching chamber 88 to surface 60 with adhesive, etc.). Portion 12R may also contact chamber 88. Chamber 88 may have elastomeric chamber walls such as wall 108 that surround air-filled cavity 106. Component 104 may be an air pressure sensor (e.g., pressure sensor 82 of FIG. 3) that is contained within cavity 106 or may be an air hose (see, e.g., tube 86 of FIG. 3) that is coupled between cavity 106 and air pressure sensor 82.

Figure 10:
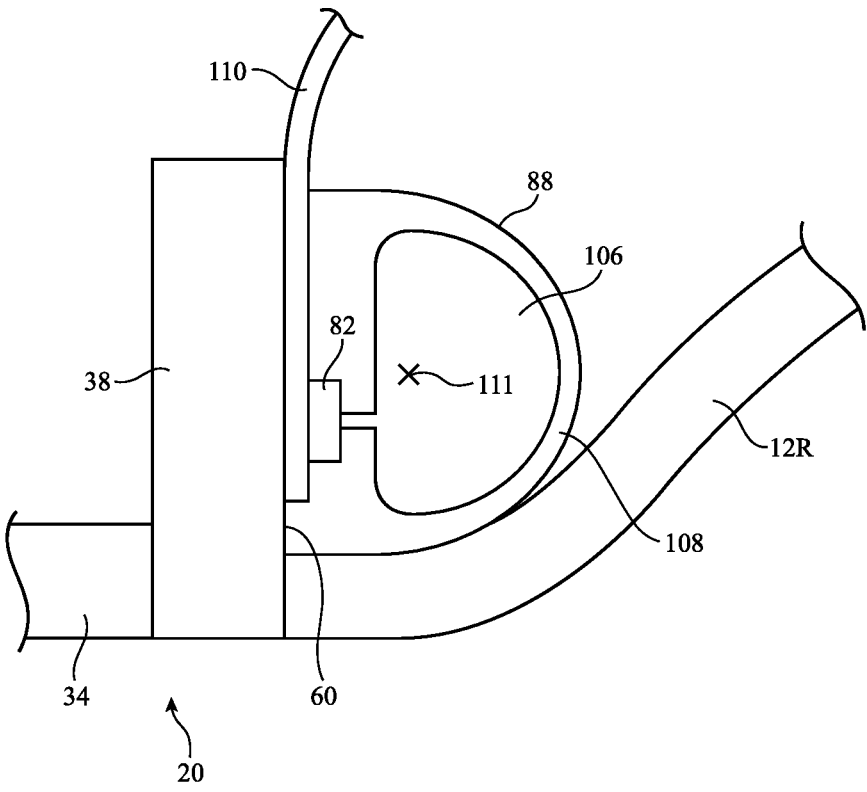
FIG. 10 is a cross-sectional view of an illustrative nose pressure sensor having a pressure sensing chamber that contains an air pressure sensor in accordance with an embodiment.

As shown in the example of FIG. 10, wall 108 of chamber 88 may be configured to form a passageway or other structure that couples air pressure sensor 82 on flexible printed circuit 110 to air-filled cavity 106 of chamber 88. If desired, pressure sensor 82 and printed circuit 110 may be mounted within cavity 106 (e.g., at location 111). Chamber 88 may be mounted between surface 60 of support 38 and the interior surface of portion 12R (as an example).

Figure 11:
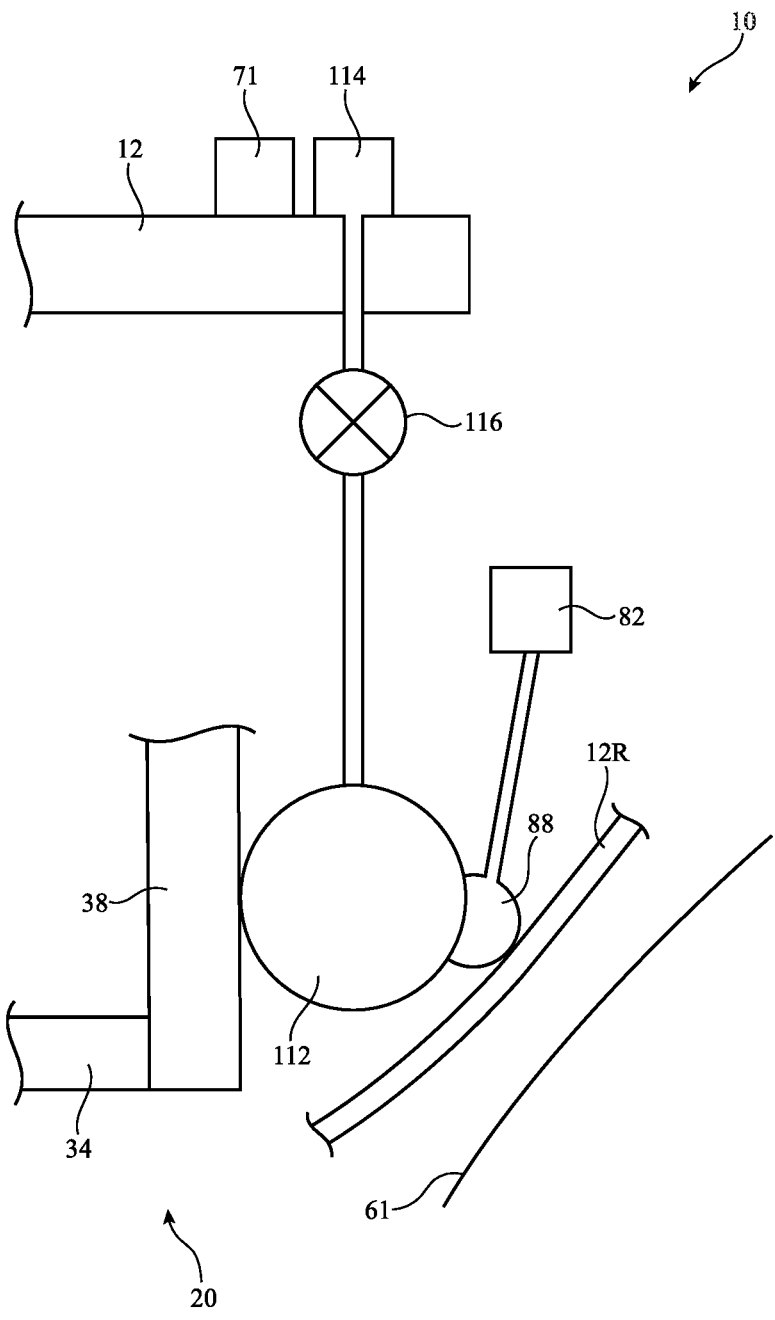
FIG. 11 is a cross-sectional view of an illustrative inflatable bladder system for deploying a nose sensor in accordance with an embodiment.

FIG. 11 is a cross-sectional view of an illustrative inflatable bladder system for deploying a nose sensor in accordance with an embodiment. As shown in FIG. 11, a button such as button 71 may be mounted on an exterior portion of housing 12 of device 10. A user may use button 71 to provide control input that controls the motion of optical assemblies 20 along guide rails 22 (FIG. 1). Button 71 may be used, for example, to control the direction and/or speed of operation of motors 48 (FIG. 1) and may therefore be used to control whether optical assemblies 20 are moved inwardly towards nose surfaces 61. Device 10 may also have a control element such as button 114 that is used to control the inflation of inflatable bladders such as bladder 112. An air pump such as pump 116 may be used to inflate and deflate bladder 112. Button 114 may be an electrical button that controls air pump 116 (e.g., air pump 116 may be an electrically-controlled air pump) or button 114 may be a mechanical button and pump 116 may be a mechanical air pump that is manually controlled by button 114. Button 114, which may sometimes be referred to as a button element, controller, controlling element, control element, etc.), may be separate from button 71, may be adjacent to button 71, or may be formed as an integral portion of button 71. When it is desired to move optical assemblies 20 towards nose surfaces 61, button 71 and button 114 may be used to turn on motors 48 in device 10 to move assemblies 20 towards nose surfaces 61 and to cause pump 116 to inflate bladder 112. The inflation of bladder 112 moves chamber 88 away from support 38 towards portion 12R and thereby helps move chamber 88 into position near nose surface 61. As a result, chamber 88 will be compressed earlier than otherwise due to nose contact pressure as assembly 20 is moved towards the user's nose. Inflation of bladder 112 may also help provide additional cushioning to help alleviate any discomfort due to nose contact with portion 12R and chamber 88. Bladder 112 may be deflated after optical assemblies 20 have been positioned as desired (e.g., to help reduce any undesired static nose pressure). There may be separate bladders 112 on the left and right of device 10 (adjacent to the left and right optical assemblies) and the inflation and deflation of these bladders may be controlled in unison by a single button or individually by separate buttons or other controls.

If desired, the control circuitry of device 10 may process the pressure signals measured by air pressure sensors 82. When chambers 88 are in contact with nose surfaces 61, the output of air pressure sensors 82 will contain user respiration and heartbeat information (e.g., the pressure will vary as the user breaths in and out and the pressure will vary as the user's heart beats). The respiration data and/or heartbeat data for the user can be extracted by the control circuitry and suitable action taken (e.g., displays 32 may display the user's current respiration rate and/or the user's respiration rate history, display 32 may display the user's current heartbeat and/or the user's heartbeat history, etc.). In general, when bladders 112 are inflated so that there is sufficient contact between nose surfaces 61 and chambers 88 and/or when chambers 88 are otherwise in contact with the skin of the user, air pressure sensors 82 may be configured to supply physiological output such as respiration rate output and/or heartbeat output. Any suitable action may then be taken in response to this gathered physiological data.

To help protect the privacy of users, any personal user information that is gathered by device 10 may be handled using best practices. These best practices including meeting or exceeding any privacy regulations that are applicable. Opt-in and opt-out options and/or other options may be provided that allow users to control usage of their personal data.

The foregoing is merely illustrative and various modifications can be made to the described embodiments. The foregoing embodiments may be implemented individually or in any combination.

What is claimed is:

1. A head-mounted device, comprising:
   a head-mounted housing;
   optical assemblies in the head-mounted housing that are configured to move towards and away from each other, wherein each optical assembly includes a support and includes a lens and a display that are supported by the support and wherein the display of each optical assembly is configured to provide an image to an eye box through the lens; and
   nose pressure sensors configured to measure nose pressure as the optical assemblies are moved towards each other, wherein each nose pressure sensor comprises:
   an air pressure sensor mounted to a flexible printed circuit; and
   a pressure-sensing compressible air-filled chamber coupled to the air pressure sensor, wherein the pressure-sensing compressible air-filled chamber is configured to be compressed by a given one of the optical assemblies and wherein the air pressure sensor is configured to measure an air pressure change in the pressure-sensing compressible air-filled chamber due to nose pressure in response to the pressure-sensing compressible air-filled chamber being compressed by the given one of the optical assemblies.

2. The head-mounted device defined in claim 1 wherein the head-mounted housing has a flexible rear portion and wherein each of the pressure-sensing compressible air-filled chambers is between the flexible rear portion and a respective one of the supports.

3. The head-mounted device defined in claim 2 wherein the pressure-sensing compressible air-filled chambers comprise elastomeric polymer walls attached to the supports.

4. The head-mounted device defined in claim 1 wherein the pressure-sensing compressible air-filled chambers are located within a flexible rear portion of the head-mounted housing.

5. The head-mounted device defined in claim 4 wherein the flexible rear portion of the head-mounted housing comprises fabric.

6. The head-mounted device defined in claim 1 wherein the head-mounted housing comprises a flexible rear portion and wherein the pressure-sensing compressible air-filled chambers are on an exterior surface of the flexible rear portion.

7. The head-mounted device defined in claim 1 further comprising inflatable bladders configured to move the pressure-sensing compressible air-filled chambers when inflated.

8. The head-mounted device defined in claim 1 further comprising tubing that couples each of the air pressure sensors to a respective one of the pressure-sensing compressible air-filled chambers.

9. The head-mounted device defined in claim 1 wherein the pressure-sensing compressible air-filled chambers comprise air-filled tubes.

10. The head-mounted device defined in claim 9 wherein the air pressure sensors each have multiple ports and wherein each of the multiple ports is connected to a respective one of the air-filled tubes.

11. The head-mounted device defined in claim 1 wherein the air pressure sensors are mounted within air-filled cavities in the pressure-sensing compressible air-filled chambers.

12. The head-mounted device defined in claim 1, wherein the air pressure sensors are in communication with air-filled cavities in the pressure-sensing compressible air-filled chambers.

13. The head-mounted device defined in claim 1 wherein the supports have exterior surfaces and wherein the pressure-sensing compressible air-filled chambers comprise tubes that wrap at least partly around the exterior surfaces.

14. A head-mounted device, comprising:
a head-mounted housing;
optical assemblies in the head-mounted housing that are configured to move towards and away from each other;
an air pressure sensor with multiple ports;
a nose-pressure-sensing compressible air-filled chamber, wherein the nose-pressure-sensing compressible air-filled chamber is configured to be compressed by a given one of the optical assemblies; and
a tube coupling the nose-pressure-sensing compressible air-filled chamber to the air pressure sensor, wherein the air pressure sensor is configured to measure an air pressure change in the nose-pressure-sensing compressible air-filled chamber in response to the nose-pressure-sensing compressible air-filled chamber being compressed by the given one of the optical assemblies.

15. The head-mounted device defined in claim 14 wherein the nose-pressure-sensing compressible air-filled chamber comprises an elastomeric block with an air-filled cavity.

16. The nose pressure sensor head-mounted device defined in claim 14 wherein the nose- pressure-sensing compressible air-filled chamber comprises an additional tube.

17. A head-mounted device, comprising:
a display and a lens configured to convey an image from the display to an eye box;
a support for the display and the lens;
a plurality of tubes wrapped at least partly around the support; and
an air pressure sensor having multiple ports, each of the ports being coupled to a respective one of the tubes.

18. The head-mounted device defined in claim 17 wherein each of the tubes comprises a compressible elastomeric tube configured to measure nose pressure towards the support.

19. The head-mounted device defined in claim 18 further comprising a guide rail along which the support moves, wherein the air pressure sensor is configured to gather physiological data.

* * * * *